United States Patent
Takeno et al.

(10) Patent No.: US 8,962,742 B2
(45) Date of Patent: Feb. 24, 2015

(54) HYDROGEL-FORMING COMPOSITION AND HYDROGEL PRODUCED FROM THE SAME

(71) Applicant: National University Corporation Gunma University, Kiryu (JP)

(72) Inventors: Hiroyuki Takeno, Kiryu (JP); Wataru Nakamura, Kiryu (JP)

(73) Assignee: National University Corporation Gunma University, Kiryu-Shi (JP)

( * ) Notice: Subject to any disclaimer, the term of this patent is extended or adjusted under 35 U.S.C. 154(b) by 0 days.

(21) Appl. No.: 13/894,982

(22) Filed: May 15, 2013

(65) Prior Publication Data

US 2014/0080956 A1     Mar. 20, 2014

Related U.S. Application Data

(63) Continuation-in-part of application No. 13/826,095, filed on Mar. 14, 2013.

(60) Provisional application No. 61/702,393, filed on Sep. 18, 2012.

(51) Int. Cl.
| | | |
|---|---|---|
| C08L 33/06 | (2006.01) | |
| C08K 3/32 | (2006.01) | |
| C08K 3/34 | (2006.01) | |
| C08K 3/20 | (2006.01) | |

(52) U.S. Cl.
CPC . *C08K 3/346* (2013.01); *C08K 3/32* (2013.01); *C08K 3/20* (2013.01); *C08K 3/34* (2013.01)
USPC .......................................... 524/560; 524/417

(58) Field of Classification Search
CPC ............. C08K 3/346; C08K 3/32; C08K 3/20
USPC ....................................................... 524/560
See application file for complete search history.

(56) References Cited

U.S. PATENT DOCUMENTS

| | | | | |
|---|---|---|---|---|
| 4,186,027 A | * | 1/1980 | Bell et al. ....................... | 106/486 |
| 5,024,778 A | * | 6/1991 | Grecsek ......................... | 510/349 |

FOREIGN PATENT DOCUMENTS

| | | | |
|---|---|---|---|
| JP | A-2002-53629 | | 2/2002 |
| JP | 2009274924 A | * | 11/2009 |
| JP | A-2009-270048 | | 11/2009 |
| JP | A-2009-274924 | | 11/2009 |
| WO | WO 2011/001657 A1 | | 1/2011 |

OTHER PUBLICATIONS

Feb. 14, 2014 Office Action issued in U.S. Appl. No. 13/826,095.
Haraguchi et al., "Nanocomposite Hydrogels: A Unique Organic-Inorganic Network Structure with Extraordinary Mechanical, Optical, and Swelling/De-swelling Properties," *Advanced Materials*, 2002, vol. 14, No. 16, pp. 1120-1124.
Wang et al., "High-water-content mouldable hydrogels by mixing clay and a dendritic molecular binder," *Nature*, 2010, vol. 463, pp. 339-343.
Labanda et al., "Rheology changes of Laponite aqueous dispersions due to the addition of sodium polyacrylates of different molecular weights," *Colloids and Surfaces A: Physiochem. Eng. Aspects*, 2007, vol. 301, pp. 8-15.
Jul. 3, 2014 Office Action issued in U.S. Appl. No. 13/826,095.

\* cited by examiner

*Primary Examiner* — Hui Chin
(74) *Attorney, Agent, or Firm* — Oliff PLC (57) ABSTRACT

A hydrogel having mechanical properties and capable of being produced simply by using and mixing an industrially obtainable polymer having high versatility and clay particles, and to provide a method of producing the hydrogel. A hydrogel-forming composition is characterized by containing a polyelectrolyte, clay particles, and a dispersant for the clay particles.

3 Claims, 9 Drawing Sheets

HYDROGEL-FORMING COMPOSITION AND HYDROGEL PRODUCED FROM THE SAME

TECHNICAL FIELD

The present invention relates to a hydrogel. More in detail, the present invention relates to a polymer/nano fine particle composite hydrogel-forming composition and a polymer/nano fine particle composite hydrogel produced from the composition and having excellent mechanical properties. In addition, the present invention relates to a polymer/nano fine particle composite hydrogel having excellent stretching properties.

BACKGROUND ART

A polymer hydrogel contains water as a main component, so that it is highly safe and it can be inexpensively produced. The polymer hydrogel places a low burden on the environment, so that it is attracting attention as a material for a soft material and it is utilized for an aromatic, a jelly, a paper diaper, and the like.

However, many types of polymer hydrogels have a heterogeneous structure in which the crosslinkage density has a distribution, and they are mechanically brittle.

To compensate for such a drawback on the mechanical properties, a polymer/nano fine particle composite-type hydrogel has been attracting attention.

As a polymer/nano fine particle composite hydrogel having excellent mechanical properties, there is disclosed a nano composite gel obtained by radically polymerizing an acrylamide-based monomer in the presence of delaminated clay particles in water (Patent Document 1 and Non-patent Document 1). As an example of a similar disclosure, there is also known a nano composite gel composed of a polymer containing a group having a carboxylic acid salt structure or a carboxylic acid anion structure in some part of the poly(meth)acrylamide and clay particles (Patent Document 2). Furthermore, there is disclosed a hydrogel obtained by mixing sodium polyacrylate, clay particles, and a polyion dendrimer having a cationic functional group at a terminal thereof (Patent Document 3 and Non-patent Document 2).

On the other hand, a dry clay film composed of a polyacrylic acid salt that is a commonly-used polymer and clay is known and is studied as a surface protecting material (Patent Document 4).

A study on a viscosity change of an aqueous dispersion of sodium polyacrylate and clay is known (Non-patent Document 3). This is not a study on a hydrogel having excellent mechanical properties.

RELATED-ART DOCUMENT

Patent Documents

Patent Document 1: Japanese Patent Application Publication No. 2002-053629 (JP 2002-053629 A)
Patent Document 2: Japanese Patent Application Publication No. 2009-270048 (JP 2009-270048 A)
Patent Document 3: International Publication No. WO 2011/001657
Patent Document 4: Japanese Patent Application Publication No. 2009-274924 (JP 2009-274924 A)

Non-Patent Documents

Non-patent Document 1: K. Haraguchi, et. al., Adv. Mater., 14(16), 1120 (2002)
Non-patent Document 2: T. Aida, et. al., Nature, 463 339 (2010)
Non-patent Document 3: Colloids and Surfaces, A Physicochemical and Engineering Aspects (2007), 301(1-3), 8-15

SUMMARY OF THE INVENTION

Problem to be Solved by the Invention

In Patent Document 1 to Patent Document 3, Non-patent Document 1, and Non-patent Document 2, polymer/nano fine particle composite gels having excellent mechanical properties are disclosed.

However, the polymer/nano fine particle composite gels described in Patent Document 1, Patent Document 2, and Non-patent Document 1 require a polymerization reaction in a production process thereof. The hydrogels disclosed in Patent Document 3 and Non-patent Document 2 require the use of special polymers (polyion dendrimers) in the production processes thereof.

In Patent Document 4, although as an intermediate, a gel paste is produced, the gel paste is mechanically brittle. The gel paste is applied onto a sheet and the resultant film after drying of the gel paste has excellent mechanical properties.

Therefore, there is desired a polymer/nano fine particle composite hydrogel having excellent mechanical properties and capable of being produced by a simpler and commonly-used method using a polymer having high versatility.

Thus, the present invention has been invented according to the above situation and it is an object of the present invention to provide a polymer/nano fine particle composite hydrogel having excellent mechanical properties and capable of being produced simply by using and mixing an industrially easily obtainable polymer having high versatility and a clay mineral (expressed also as clay particles in the present specification). In addition, it is another object of the present invention to provide a polymer/nano fine particle composite hydrogel having excellent stretching properties.

Means for Solving the Problem

As a result of assiduous research for solving the above problem, the inventors of the present invention found that by mixing a polyelectrolyte, clay particles, and a dispersant for the clay particles, a polymer/nano fine particle composite hydrogel having excellent mechanical properties can be obtained, and have completed the present invention. In addition, they found that by controlling the content of a polyelectrolyte, clay particles, and a dispersant for the clay particles, a polymer/nano fine particle composite hydrogel having excellent stretching properties can be obtained, and have completed the present invention.

That is, the present invention relates to, according to a first aspect, a hydrogel-forming composition, characterized by containing a polyelectrolyte (A), clay particles (B), and a dispersant (C) for the clay particles.

The present invention relates to, according to a second aspect, the hydrogel-forming composition according to the first aspect, in which the polyelectrolyte (A) is a polyelectrolyte having an organic acid salt structure or an organic acid anion structure.

The present invention relates to, according to a third aspect, the hydrogel-forming composition according to the second aspect, in which the polyelectrolyte (A) is a polyelectrolyte having a carboxylic acid salt structure or a carboxylic acid anion structure.

The present invention relates to, according to a fourth aspect, the hydrogel-forming composition according to the third aspect, in which the polyelectrolyte (A) is a completely neutralized or partially neutralized polyacrylic acid salt.

The present invention relates to, according to a fifth aspect, the hydrogel-forming composition according to the fourth aspect, in which the polyelectrolyte (A) is a completely neutralized or partially neutralized polyacrylic acid salt having a weight average molecular weight of 1,000,000 to 10,000,000.

The present invention relates to, according to a sixth aspect, the hydrogel-forming composition according to any one of the first aspect to the fifth aspect, in which each of the clay particles (B) is a water-swelling silicic acid salt particle.

The present invention relates to, according to a seventh aspect, the hydrogel-forming composition according to the sixth aspect, in which each of the clay particles (B) is a water-swelling silicic acid salt particle selected from the group consisting of smectite, bentonite, vermiculite, and mica.

The present invention relates to, according to an eighth aspect, the hydrogel-forming composition according to any one of the first aspect to the seventh aspect, in which the dispersant (C) is a dispersant for water-swelling silicic acid salt particles.

The present invention relates to, according to a ninth aspect, the hydrogel-forming composition according to the eighth aspect, in which the dispersant (C) is one or two or more selected from the group consisting of sodium orthophosphate, sodium diphosphate, sodium tripolyphosphate, sodium tetraphosphate, sodium hexametaphosphate, and sodium polyphosphate.

The present invention relates to, according to a tenth aspect, a hydrogel produced from the hydrogel-forming composition described in any one of the first aspect to the ninth aspect.

The present invention relates to, according to an eleventh aspect, a method of producing a hydrogel, characterized by mixing the polyelectrolyte (A), the clay particles (B), and the dispersant (C) defined in any one of the first aspect to the ninth aspect, and water or a water-containing solvent to cause gelation of the resultant mixture.

The present invention relates to, according to a twelfth aspect, a stretchable hydrogel which is produced from a hydrogel-forming composition comprising a polyelectrolyte (A), clay particles (B), and a dispersant (C) for the clay particles, in which a product formed from the hydrogel-forming composition in a form of column having a diameter of 6 mm and a length of 2 cm is stretchable 2 times or more in length direction.

The present invention relates to, according to a thirteenth aspect, the hydrogel-forming composition according to the twelfth aspect, in which in the 100% by mass of the stretchable hydrogel, the polyelectrolyte (A) is contained in an amount of 0.1 to 2.0% by mass, the clay particles (B) is contained in an amount of 1.0 to 5.0% by mass, and the dispersant (C) is contained in an amount of 0.1 to 1.0% by mass.

The present invention relates to, according to a fourteenth aspect, the hydrogel-forming composition according to the twelfth or thirteenth aspect, in which the polyelectrolyte (A) is a completely neutralized or partially neutralized polyacrylic acid salt having a weight average molecular weight of 1,000,000 to 10,000,000, the clay particles (B) is a water-swelling silicic acid salt particle selected from the group consisting of smectite, bentonite, vermiculite, and mica, and the dispersant (C) is one or two or more selected from the group consisting of sodium orthophosphate, sodium diphosphate, sodium tripolyphosphate, sodium tetraphosphate, sodium hexametaphosphate, and sodium polyphosphate.

The present invention relates to, according to a fifteenth aspect, a method of producing an stretchable hydrogel, characterized by comprising:

mixing the polyelectrolyte (A), the clay particles (B), and the dispersant (C) as specified in any one of the twelfth to fourteenth aspects, and water or a water-containing solvent to cause gelation of the resultant mixture.

EFFECTS OF THE INVENTION

The hydrogel of the present invention has excellent mechanical properties, that is, has satisfactory strength. For example, typically, the hydrogel has such rigidity ("elastic modulus") or such strength ("breaking stress") that allows the hydrogel to maintain the shape of the gel without a support such as a container, that is, has so-called self-supporting properties. In the specification, the "self-supporting properties" mean strength that in the uniaxial compression test that will be explained at paragraph No. 0024, the stress at a time point when the distortion factor of hydrogel is 80% ranges from 10 kPa to 1000 kPa.

The hydrogel of the present invention can be produced by mixing the polyelectrolyte, the clay particles, the dispersant, and water or a water-containing solvent.

Furthermore, the elastic modulus of the hydrogel of the present invention can be controlled by varying the content of the component (B): clay particles.

In addition, the stretchable hydrogel of the present invention is stretchable 2 times or more in length direction in a form of column having a diameter of 6 mm and a length of 2 cm.

MODES FOR CARRYING OUT THE INVENTION

The clay particle, for example, LAPONITE (manufactured by Rockwood Additives Limited, registered trade name of Rockwood Additives Limited) is a disk-shaped particle in which: an edge face is positively charged and, on the other hand, a surface is negatively charged; and a layer structure is formed through a sodium ion. By adding water to this LAPONITE particle, a sodium ion is hydrated with a water molecule and a delamination is caused. Then, a positively-charged edge face of a LAPONITE particle is bonded with a negatively-charged surface of a LAPONITE particle through an electrostatic interaction and it is known that as the result thereof, the LAPONITE particles form a card house structure and enhance the viscosity of an aqueous dispersion thereof.

On the contrary, it is also known that a dispersant such as sodium diphosphate (alias: sodium pyrophosphate) is adsorbed to the positively charged edge face of the LAPONITE particle to accelerate the dispersion of the LAPONITE particle and further to suppress the formation of the card house structure.

It is considered that when a polyelectrolyte is added into a state in which clay particles are homogeneously dispersed in water, an interaction between the clay particle and the polyelectrolyte is newly generated and a homogeneous polymer/clay network is constructed, so that a polymer/nano fine particle composite hydrogel having excellent mechanical properties is formed.

That is, the present invention is based on the findings that by blending a dispersant (C) and a polyelectrolyte (A) to clay particles (B), a polymer/nano fine particle composite hydrogel excellent in mechanical properties can be obtained, and relates to a hydrogel-forming composition characterized by containing a polyelectrolyte (A), clay particles (B), and a dispersant (C).

In the hydrogel-forming composition of the present invention and a hydrogel produced therefrom, besides the components (A) to (C), if necessary, other components may be optionally blended so long as the expected effect of the present invention is not impaired.

[Hydrogel-Forming Composition]
<Component (A): Polyelectrolyte>

The component (A) of the present invention is a polyelectrolyte, preferably an anionic polyelectrolyte, more preferably a polyelectrolyte having an organic acid salt structure or an organic acid anion structure.

Examples of such a polyelectrolyte include: a polyelectrolyte having a carboxy group such as a poly(meth)acrylic acid salt, a salt of a carboxy-vinyl polymer, and a salt of carboxy methylcellulose; a polyelectrolyte having a sulfonyl group such as a polystyrenesulfonic acid salt; and a polyelectrolyte having a phosphonyl group such as a polyvinyl phosphonic acid salt. Examples of the salt include a sodium salt, an ammonium salt, a potassium salt, and a lithium salt. In the present invention, (meth)acrylic acid refers to both acrylic acid and methacrylic acid.

The polyelectrolyte (A) may be crosslinked or copolymerized and may be a completely neutralized product or a partially neutralized product.

The polyelectrolyte (A) has a weight average molecular weight measured by gel permeation chromatography (GPC) in terms of polyethylene glycol of preferably 1,000,000 to 10,000,000, more preferably 2,000,000 to 7,000,000.

A commercially available polyelectrolyte (A) has a weight average molecular weight described on the commercial product of preferably 1,000,000 to 10,000,000, more preferably 2,000,000 to 7,000,000.

In the present invention, among the above polyelectrolytes, the polyelectrolyte (A) is preferably a polyelectrolyte having a carboxylic acid salt structure or a polyelectrolyte having a carboxylic acid anion structure, particularly preferably a completely neutralized or partially neutralized polyacrylic acid salt. Specifically, the polyelectrolyte (A) is preferably completely neutralized or partially neutralized sodium polyacrylate, particularly preferably a completely neutralized or partially neutralized non-crosslinked-type highly polymerized sodium polyacrylate having a weight average molecular weight of 2,000,000 to 7,000,000.

The content of the polyelectrolyte (A) is 0.01% by mass to 20% by mass, preferably 0.1% by mass to 10% by mass, and more preferably 0.1% by mass to 2% by mass relative to 100% by mass of the hydrogel.

In the present specification, % by mass is expressed also as % by weight.

<Component (B): Clay Particle>

The component (B) of the present invention is a clay particle, preferably a clay nano fine particle. Specifically, the component (B) is preferably a water-swelling silicic acid salt particle.

Examples of the clay particles (B) include smectite, bentonite, vermiculite, and mica and the clay particles (B) are preferably particles forming colloid in a dispersion medium of water or a water-containing solvent. In the meantime, the smectite is a general term for monmorillonite, beidellite, nontronite, saponite, hectorite, stevensite, and the like. Examples of the shape of a primary particle of the clay include a disk shape, a plate shape, a sphere shape, a grain shape, a cube shape, a needle shape, a bar shape, and an amorphous shape, and the shape is preferably a disk shape or plate shape having a diameter of 5 nm to 1,000 nm.

Preferred specific examples of the clay include a layered silicic acid salt and easily commercially available examples thereof include: the products manufactured by Rockwood Additives Limited such as LAPONITE XLG (synthetic hectorite), XLS (synthetic hectorite, containing sodium diphosphate as a dispersant), XL21 (sodium magnesium fluorosilicate), RD (synthetic hectorite), RDS (synthetic hectorite, containing inorganic polyphosphoric acid salt as a dispersant), and S482 (synthetic hectorite, containing a dispersant); the products manufactured by Co-op Chemical Co., Ltd. such as Lucentite (registered trade name of Co-op Chemical Co., Ltd.) SWN (synthetic smectite) and SWF (synthetic smectite), micro mica (synthetic mica), and Somasif (registered trade name of Co-op Chemical Co., Ltd., synthetic mica); the products manufactured by Kunimine Industries Co., Ltd. such as Kunipia (registered trade name of Kunimine Industries Co., Ltd., montmorillonite) and Sumecton (registered trade name of Kunimine Industries Co., Ltd.) SA (synthetic saponite); and the products manufactured by Hojun Co., Ltd. such as BEN-GEL (registered trade name of Hojun Co., Ltd., purified product of natural bentonite).

The content of the clay particles (B) is 0.01% by mass to 20% by mass and preferably 0.1% by mass to 15% by mass relative to 100% by mass of the hydrogel.

<Component (C): Dispersant for Clay Particle>

The component (C) of the present invention is a dispersant for the clay particles (B) and is preferably a dispersant for water-swelling silicic acid salt particles.

As the dispersant (C), a dispersant or a deflocculant used for the purpose of enhancing the dispersibility of the silicic acid salt or delaminating a layered silicic acid salt can be used.

When the clay particles (B) is dispersed in water of a low content of about 3% by mass or less, uniform dispersion can be occasionally achieved without the use of the dispersant (C). However, the dispersant (C) is an essential component in order to prepare the hydrogel of the present invention. When only the polyelectrolyte (A) and the clay particles (B) are mixed in water without the use of the dispersant (C), the hydrogel having self-supporting properties cannot be prepared, and a viscous material in a form of paste is obtained.

Examples of the dispersant (C) include sodium orthophosphate, sodium diphosphate (sodium pyrophosphate), sodium tripolyphosphate, sodium tetraphosphate, sodium hexametaphosphate, and sodium polyphosphate. Among them, preferred is sodium diphosphate.

The content of the dispersant (C) is 0.001% by mass to 20% by mass, preferably 0.01% by mass to 10% by mass, and more preferably 0.1% by mass to 2.0% by mass, relative to 100% by mass of the hydrogel.

In the present invention, when, as the component (B), clay particles containing a dispersant are used, a dispersant as the component (C) may be either further added or not added.

Examples of the preferred combination of the polyelectrolyte (A), the clay particles (B), and the dispersant (C) include a combination of a polyelectrolyte (A): 0.1% by mass to 10% by mass of completely neutralized or partially neutralized non-crosslinked-type highly polymerized sodium polyacrylate having a weight average molecular weight of 2,000,000 to 7,000,000, a component (B): 0.1% by mass to 15% by mass of water-swelling smectite, and a component (C): 0.01% by mass to 10% by mass of sodium diphosphate, relative to 100% by mass of the hydrogel.

In addition, examples of the more preferred combination of the polyelectrolyte (A), the clay particles (B), and the dispersant (C) include a combination of a polyelectrolyte (A): 0.1% by mass to 2.0% by mass of completely neutralized or partially neutralized non-crosslinked-type highly polymerized sodium polyacrylate having a weight average molecular weight of 2,000,000 to 7,000,000, a component (B): 0.1% by mass to 15% by mass of water-swelling smectite, and a component (C): 0.1% by mass to 2.0% by mass of sodium diphosphate, relative to 100% by mass of the hydrogel.

The hydrogel-forming composition of the present invention may contain an alcohol.

The alcohol is preferably a water-soluble alcohol capable of being freely dissolved in water, more preferably a $C_{1-8}$ alcohol and specific examples thereof include methanol, ethanol, 2-propanol, isobutanol, pentanol, hexanol, 1-octanol, and isooctanol.

[Hydrogel and Production Method Thereof]

The hydrogel of the present invention can be obtained by mixing the hydrogel-forming composition and then settling it to cause gelation.

The gelation using the hydrogel-forming composition can be performed by mixing a mixture of two components of the hydrogel-forming composition, an aqueous solution thereof, or an aqueous dispersion thereof and the rest one component, an aqueous solution thereof, or an aqueous dispersion thereof. The gelation can also be performed by adding water to a mixture of these components.

Among these methods, from viewpoint of easy handling, it is preferable to perform gelation by mixing an aqueous solution or an aqueous dispersion of the polyelectrolyte (A), and an aqueous solution or an aqueous dispersion of the clay particles (B), and the dispersant (C).

Although as the method for mixing the components in the hydrogel-forming composition, an ultrasonication can be used besides a mechanical stirring and a manual stirring, a mechanical stirring is preferred. Examples of the machine capable of being used for the mechanical stirring include a magnetic stirrer, a propeller stirrer, a rotation-revolution-type mixer, a dispenser, a homogenizer, a shaker, a vortex mixer, a ball mill, a kneader, a line mixer and a ultrasonic wave oscillator.

The temperature for the mixing is a solidifying point to a boiling point of the above aqueous solution or the above aqueous dispersion, preferably −5° C. to 100° C. and more preferably 0° C. to 50° C.

When foam is generated immediately after the mixing, defoaming is preferably performed using a centrifuge. The time for defoaming using a centrifuge is, for example, 10 minutes to 20 minutes.

Although the mixture immediately after the mixing is a paste having a small strength, when the mixture is settled, the mixture becomes gelled. The time for settling is preferably 2 hours to 100 hours. The temperature for settling is −5° C. to 100° C. and preferably 0° C. to 50° C. By pouring the mixture before gelled immediately after the mixing into a mold or by extrusion-molding the mixture, a gel can be produced in any shape.

The strength of the obtained hydrogel can be measured in a uniaxial compression test. For example, a hydrogel in a column shape having a diameter of 10 mm and a height of 6 mm is produced and the hydrogel is settled at room temperature for 4 days. Then, the strength of the hydrogel can be measured using TENSILE TESTER STM-20 (manufactured by Orientec Co., Ltd.). The measuring method is a method by compressing the molded sample at a compression rate of 10 mm/min to measure a stress change.

The stress at a time point when the distortion factor is 80% ($\Delta L/L_0 = 0.8$) is measured by a measurement in the above uniaxial compression test. Here, $\Delta L$ is a compressed length and $L_0$ is a natural length. The stress is measured by taking into consideration an area change (calculated under such an assumption that the volume is not changed during the compression).

The stress of the hydrogels obtained by the present invention at a time point when the distortion factor is 80% ($\Delta L/L_0 = 0.8$) is 10 kPa to 1,000 kPa. For an application of the hydrogel requiring high strength, examples of the lower limit of the stress include 12 kPa, 20 kPa, 50 kPa and 70 kPa and examples of the upper limit of the stress include 150 kPa, 300 kPa, and 500 kPa. Examples of the stress ranges are 12 kPa to 150 kPa, 50 kPa to 500 kPa, 70 kPa to 150 kPa, and 70 kPa to 500 kPa.

[Stretchable Hydrogel]

The present invention is related to an stretchable hydrogel which is produced from a hydrogel-forming composition comprising a polyelectrolyte (A), clay particles (B), and a dispersant (C) for the clay particles, and which is stretchable 2 times or more in length direction.

That is, the stretchable hydrogel of the present invention is stretchable 2 to 10 times in length direction in a form of column having a diameter of 6 mm and a length of 2 cm. Examples of the lower limit of the stretching ratio include 2 times and 3 times, and examples of the higher limit thereof include 6 times, 8 times and 10 times.

In the present invention, as the polyelectrolyte (A), the compounds mentioned in the <Component (A): polyelectrolyte> can be used, as the clay particles (B), the compounds mentioned in the <Component (B): clay particle>, and as the dispersant (C), the compounds mentioned in the <Component (C): dispersant for clay particle>.

In addition, the stretchable hydrogel of the present invention is produced by controlling the content of the polyelectrolyte (A), the clay particles (B), and the dispersant (C) for the clay particles. Thus, the content of the polyelectrolyte (A) is 0.01% by mass to 5.0% by mass, and preferably 0.1% by mass to 2.0% by mass relative to 100% by mass of the hydrogel, the content of the clay particles (B) is 0.1% by mass to 10% by mass, and preferably 1.0% by mass to 5.0% by mass relative to 100% by mass of the hydrogel, and the content of the dispersant (C) is 0.01% by mass to 5.0% by mass, and preferably 0.1% by mass to 1.0% by mass relative to 100% by mass of the hydrogel.

Examples of the preferred combination of the polyelectrolyte (A), the clay particles (B), and the dispersant (C) in the stretchable hydrogel of the present invention include a combination of a polyelectrolyte (A): 0.1% by mass to 2% by mass of completely neutralized or partially neutralized non-crosslinked-type highly polymerized sodium polyacrylate having a weight average molecular weight of 2,000,000 to 7,000,000, a component (B): 1% by mass to 5% by mass of water-swelling smectite, and a component (C): 0.1% by mass to 1.0% by mass of sodium diphosphate, relative to 100% by mass of the hydrogel.

In addition, the stretchable hydrogel of the present invention can be produced according to the same method as the method explained in the [Hydrogel and production method thereof]. Among these methods, from viewpoint of easy handling, it is preferable to perform gelation by mixing an aqueous solution or an aqueous dispersion of the polyelectrolyte (A), and an aqueous solution or an aqueous dispersion of the clay particles (B), and the dispersant (C). In that case, the mixing ratio of an aqueous solution or an aqueous dispersion of the polyelectrolyte (A), and an aqueous solution or an aqueous dispersion of the clay particles (B), and the dispersant (C) is preferably 1:2 to 2:1 based on volume.

EXAMPLES

Hereinafter, the present invention will be more specifically described referring to Examples that should not be construed as limiting the scope of the present invention.

Example 1

Production of LAPONITE RD 5% by Weight/ASAP 1% by Weight/TSPP 0.5% by Weight Hydrogel 0.021 g of sodium diphosphate decahydrate (sodium pyrophosphate decahydrate) (TSPP) (manufactured by Kanto Chemical Industry Co., Ltd.) and 2.328 g of water were mixed and the resultant mixture was stirred with a magnetic stirrer at room temperature (about 20° C.) until the mixture became a homogeneous TSPP aqueous solution. Then, while the TSPP aqueous solution was stirred with a magnetic stirrer, to the TSPP aqueous solution, 0.126 g of LAPONITE RD (manufactured by Rockwood Additives Limited) was added little by little and the resultant mixture was stirred at room temperature (about 20° C.) until the mixture became a homogeneous aqueous dispersion. Then, to the resultant aqueous dispersion, 0.026 g of sodium polyacrylate (ASAP) (manufactured by Wako Pure Chemical Industries, Ltd.; degree of polymerization: 22,000 to 70,000, viscosity of a 2 g/L aqueous solution thereof at 30° C.: 350 to 560 mPa·s) was added little by little and the resultant mixture was stirred manually using a spatula instead of the magnetic stirrer until ASAP has been completely dissolved.

Then, the mixture was defoamed using a centrifuge (at 7,000 rpm for 10 minutes) and was settled at room temperature for 48 hours to obtain a hydrogel.

Example 2 to Example 5

Production of LAPONITE RD 7.5% by Weight to 15% by Weight/ASAP 1% by Weight/TSPP 0.5% by Weight Hydrogels By the same operation as in Example 1, a hydrogel which contains LAPONITE RD at each concentration listed in Table 1 was produced.

TABLE 1

| Example | LAPONITE RD concentration [% by weight] | ASAP concentration [% by weight] | TSPP concentration [% by weight] |
| --- | --- | --- | --- |
| 1 | 5 | 1 | 0.5 |
| 2 | 7.5 | 1 | 0.5 |
| 3 | 10 | 1 | 0.5 |
| 4 | 12.5 | 1 | 0.5 |
| 5 | 15 | 1 | 0.5 |

Example 6

Production of LAPONITE RD 10% by Weight/ASAP 0.25% by Weight/TSPP 0.5% by Weight Hydrogel 0.017 g of sodium diphosphate decahydrate (sodium pyrophosphate decahydrate) (TSPP) (manufactured by Kanto Chemical Industry Co., Ltd.) and 1.772 g of water were mixed and the resultant mixture was stirred with a magnetic stirrer at room temperature (about 20° C.) until the mixture became a homogeneous TSPP aqueous solution. Then, while the TSPP aqueous solution was stirred with a magnetic stirrer, to the TSPP aqueous solution, 0.200 g of LAPONITE RD (manufactured by Rockwood Additives Limited) was added little by little and the resultant mixture was stirred at room temperature (about 20° C.) until the mixture became a homogeneous aqueous dispersion. Then, to the resultant aqueous dispersion, 0.005 g of sodium polyacrylate (ASAP) (manufactured by Wako Pure Chemical Industries, Ltd.; degree of polymerization: 22,000 to 70,000, viscosity of a 2 g/L aqueous solution thereof at 30° C.: 350 to 560 mPa·s) was added little by little and the resultant mixture was stirred manually using a spatula instead of the magnetic stirrer until ASAP has been completely dissolved.

Then, the mixture was defoamed using a centrifuge (at 7,000 rpm for 10 minutes) and was settled at room temperature for 48 hours to obtain a hydrogel.

Example 7 to Example 12

Production of LAPONITE RD 10% by Weight/ASAP 0.5% by Weight to 5% by Weight/TSPP 0.5% by Weight Hydrogels By the same operation as in Example 6, a hydrogel which contains ASAP at each concentration listed in Table 2 was produced.

TABLE 2

| Example | LAPONITE RD Concentration [% by weight] | ASAP concentration [% by weight] | TSPP concentration [% by weight] |
|---|---|---|---|
| 6 | 10 | 0.25 | 0.5 |
| 7 | 10 | 0.5 | 0.5 |
| 8 | 10 | 1 | 0.5 |
| 9 | 10 | 2 | 0.5 |
| 10 | 10 | 3 | 0.5 |
| 11 | 10 | 4 | 0.5 |
| 12 | 10 | 5 | 0.5 |

Example 13

Production of LAPONITE RD 5% by Weight/ASAP 1% by Weight/TSPP 0.25% by Weight Hydrogel 0.0084 g of sodium diphosphate decahydrate (sodium pyrophosphate decahydrate) (TSPP) (manufactured by Kanto Chemical Industry Co., Ltd.) and 1.8727 g of water were mixed and the resultant mixture was stirred with a magnetic stirrer at room temperature (about 20° C.) until the mixture became a homogeneous TSPP aqueous solution. Then, while the TSPP aqueous solution was stirred with a magnetic stirrer, to the TSPP aqueous solution, 0.100 g of LAPONITE RD (manufactured by Rockwood Additives Limited) was added little by little and the resultant mixture was stirred at room temperature (about 20° C.) until the mixture became a homogeneous aqueous dispersion. Then, to the resultant aqueous dispersion, 0.02 g of sodium polyacrylate (ASAP) (manufactured by Wako Pure Chemical Industries, Ltd.; degree of polymerization: 22,000 to 70,000, viscosity of a 2 g/L aqueous solution thereof at 30° C.: 350 to 560 mPa·s) was added little by little and the resultant mixture was stirred manually using a spatula instead of the magnetic stirrer until ASAP has been completely dissolved.

Then, the mixture was defoamed using a centrifuge (at 7,000 rpm for 10 minutes) and was settled at room temperature for 48 hours to obtain a hydrogel.

Example 14, Example 15, and Comparative Example 1

Production of LAPONITE RD 5% by Weight/ASAP 1% by Weight/TSPP 0.0% by Weight to 0.75% by Weight Hydrogels By the same operation as in Example 13, a hydrogel which contains TSPP at each concentration listed in Table 3 was produced. As a comparative example, a hydrogel containing no TSPP was intended to produce, but no hydrogel could be produced and a viscous material in a form of paste was obtained (Comparative Example 1).

TABLE 3

| | LAPONITE RD concentration [% by weight] | ASAP concentration [% by weight] | TSPP concentration [% by weight] |
|---|---|---|---|
| Comparative Example 1 | 5 | 1 | 0.0 |
| Example 13 | 5 | 1 | 0.25 |
| Example 14 | 5 | 1 | 0.5 |
| Example 15 | 5 | 1 | 0.75 |

Example 16 to Example 19 and Comparative Example 2

Production of LAPONITE RD 10% by Weight/ASAP 1% by Weight/TSPP 0.0% by Weight to 1.0% by Weight Hydrogels By the same operation as in Example 13, a hydrogel which contains TSPP at each concentration listed in Table 4, LAPONITE RD at a concentration of 10% by weight, and ASAP at a concentration of 1% by weight was produced. As a comparative example, a hydrogel containing no TSPP was intended to produce, but no hydrogel could be produced and a viscous material in a form of paste was obtained (Comparative Example 2).

TABLE 4

| | LAPONITE RD concentration [% by weight] | ASAP concentration [% by weight] | TSPP concentration [% by weight] |
|---|---|---|---|
| Comparative Example 2 | 10 | 1 | 0.0 |
| Example 16 | 10 | 1 | 0.25 |
| Example 17 | 10 | 1 | 0.5 |
| Example 18 | 10 | 1 | 0.75 |
| Example 19 | 10 | 1 | 1.0 |

Example 20 to Example 24 and Comparative Example 3

Production of LAPONITE RD 15% by Weight/ASAP 1% by Weight/TSPP 0.0% by Weight to 1.25% by Weight Hydrogels By the same operation as in Example 13, a hydrogel which contains TSPP at each concentration listed in Table 5, LAPONITE RD at a concentration of 15% by weight, and ASAP at a concentration of 1% by weight was produced. As a comparative example, a hydrogel containing no TSPP was intended to produce, but no hydrogel could be produced and a viscous material in a form of paste was obtained (Comparative Example 3).

TABLE 5

| | LAPONITE RD concentration [% by weight] | ASAP concentration [% by weight] | TSPP concentration [% by weight] |
|---|---|---|---|
| Comparative Example 3 | 15 | 1 | 0.0 |
| Example 20 | 15 | 1 | 0.25 |
| Example 21 | 15 | 1 | 0.5 |
| Example 22 | 15 | 1 | 0.75 |
| Example 23 | 15 | 1 | 1.0 |
| Example 24 | 15 | 1 | 1.25 |

Example 25 to Example 27

Production of LAPONITE XLG 10% by Weight/TSPP 0.5% by Weight Hydrogels Using 1% by Weight of ASAP Having Corresponding Molecular Weight By the same operation as in Example 3, except that LAPONITE RD was changed to LAPONITE XLG (manufactured by Rockwood Additives Limited) and sodium polyacrylate (ASAP) (degree of polymerization: 22,000 to 70,000) was changed to sodium polyacrylate (ASAP) (manufactured by Wako Pure Chemical Industries, Ltd.; degree of polymerization: 2,700 to 7,500, viscosity of a 100 g/L aqueous solution thereof at 25° C.: 75 to 125 mPa·s), sodium polyacrylate (ASAP) (trade name: Aronvis MX; manufactured by Toagosei Co., Ltd.; weight average molecular weight: 2,000,000 to 3,000,000), or sodium polyacrylate (ASAP) (trade name: Aronvis SX; manufactured by Toagosei Co., Ltd.; weight average molecular weight: 4,000,000 to 5,000,000), each hydrogel was produced.

TABLE 6

| | ASAP molecular weight |
|---|---|
| Example 25 | 250,000 to 710,000[remark 1] |
| Example 26 | Weight average molecular weight 2,000,000 to 3,000,000 |
| Example 27 | Weight average molecular weight 4,000,000 to 5,000,000 |

[remark 1]Degree of polymerization × molar mass of monomer unit (molar mass of monomer unit = 94)

Example 28

Measurements of Degree of Swelling and Gel Fraction of Hydrogel Using LAPONITE RD at Each Concentration The degree of swelling was defined as $W_{gel}(t)/W_{dry}$ and the gel fraction was defined as $W_{dry}/W_{cal} \times 100$ to measure the degree of swelling and the gel fraction of the hydrogels produced in Example 1, Example 3, and Example 5.

Here, $W_{gel}(t)$ is a mass of the sample after t hours from the initiation of swelling; $W_{dry}$ is a mass of the sample after the swelled sample was freeze-dried; and $W_{cal}$ is a mass of the solute (ASAP+LAPONITE+TSPP) before the initiation of swelling, which is calculated from a charged composition. The sample was defoamed by a centrifuge (at 7,000 rpm for 10 minutes) and was molded into a column shape having a diameter of 6 mm and a length of 8 mm.

Figure 1:
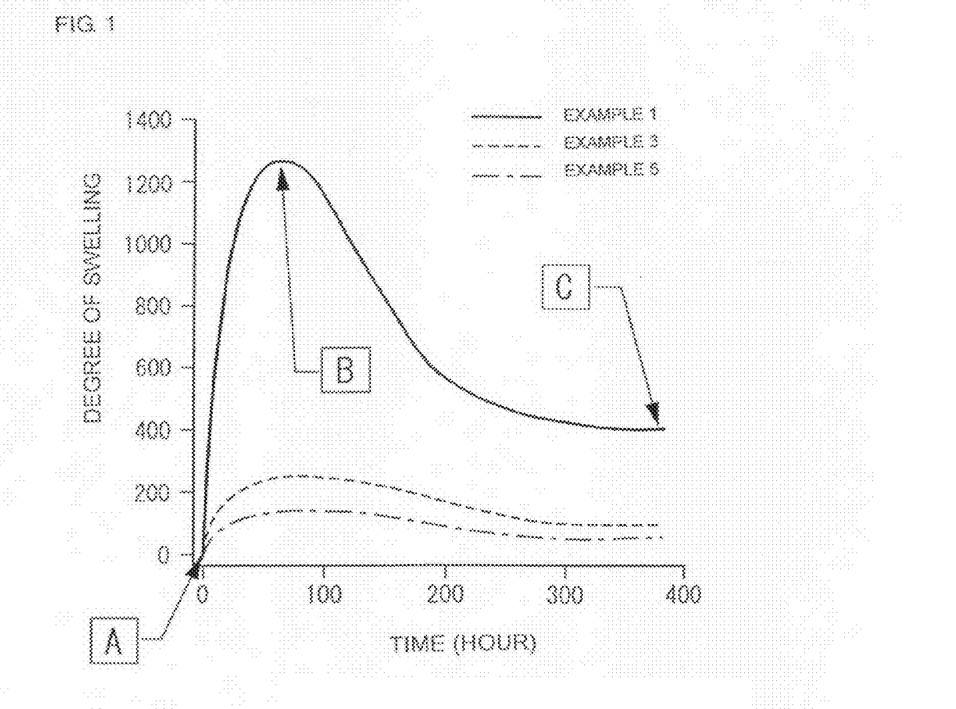
FIG. 1 is a graph of the results of degrees of swelling measured in Example 28.
Figure 2:
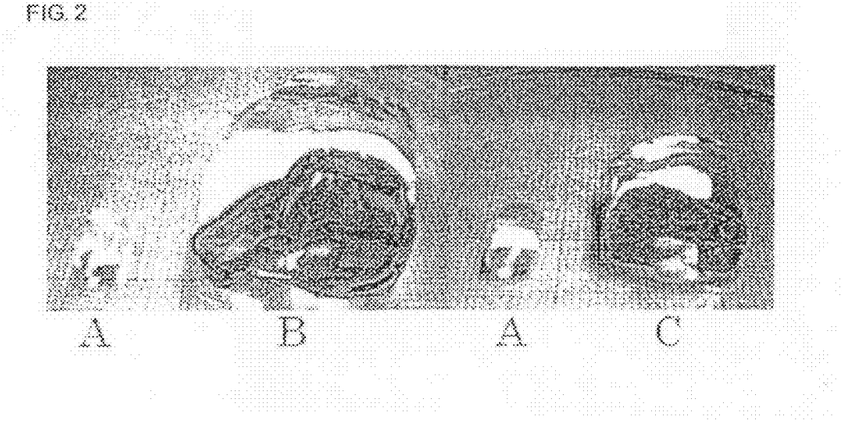
FIG. 2 is a photograph showing hydrogels at time points A, B, and C specified in FIG. 1.

The molded sample was immersed in 200 mL of distilled water and was retrieved after a lapse of a predetermined time and excessive water drops attached to the sample was wiped off to measure the mass ($W_{gel}(t)$) of the sample with a balance. After the sample reached an equilibrium swelling state, the sample was freeze-dried to measure the mass ($W_{dry}$) of the sample. The results of the measurement of the degree of swelling are listed in FIG. 1. FIG. 2 shows hydrogels at time points of A, B, and C specified in FIG. 1. As the result thereof, the gel fraction was 65% to 80%. The hydrogel of Example 1 in which the concentration of LAPONITE RD was 5% by weight, the concentration of ASAP was 1% by weight, and the concentration of TSPP was 0.5% by weight, exhibited maximum 1,200 times of the degree of swelling.

Example 29

Uniaxial Compression Test of Hydrogel Using LAPONITE RD at Each Concentration

The stress change of each of the hydrogels produced in Example 1 to Example 5 and the viscous material in a form of paste produced in Comparative Example 1 to Comparative Example 3 was measured using TENSILE TESTER S™-20 (manufactured by Orientec Co., Ltd.). The sample was defoamed using a centrifuge (at 7,000 rpm for 10 minutes), was molded into a column shape having a diameter of 10 mm and a height of 6 mm, and was settled at room temperature for 4 days.

Figure 3:
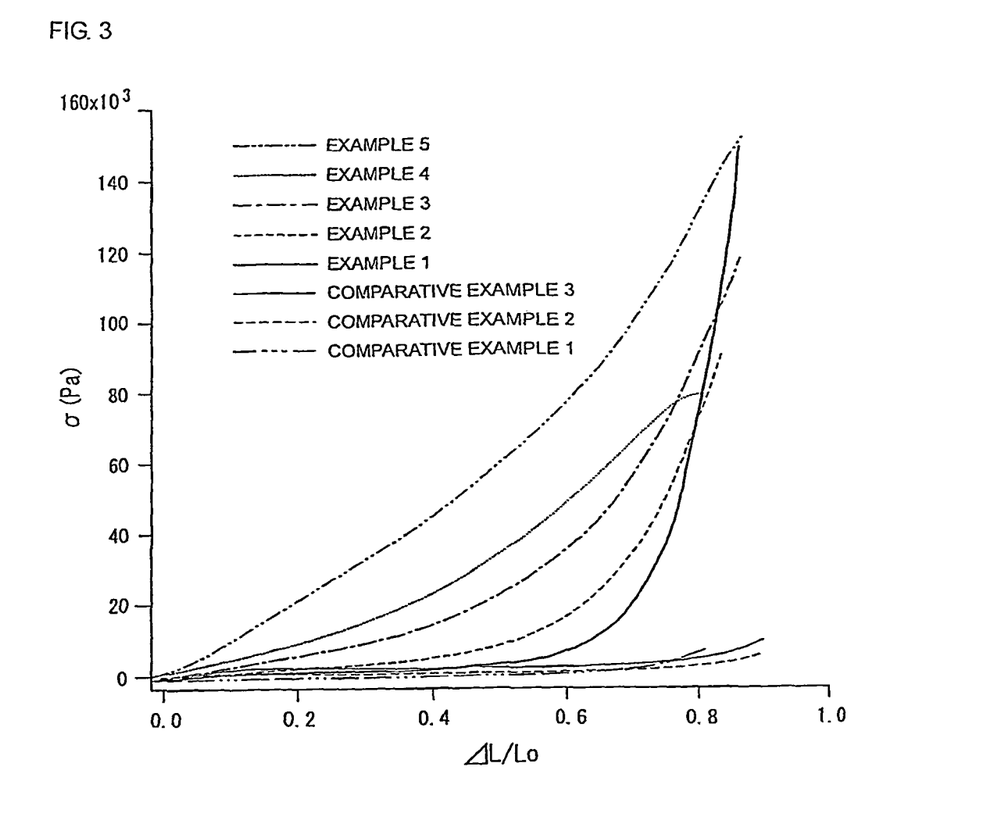
FIG. 3 is a graph of the results of stress changes measured in Example 29.
Figure 4:
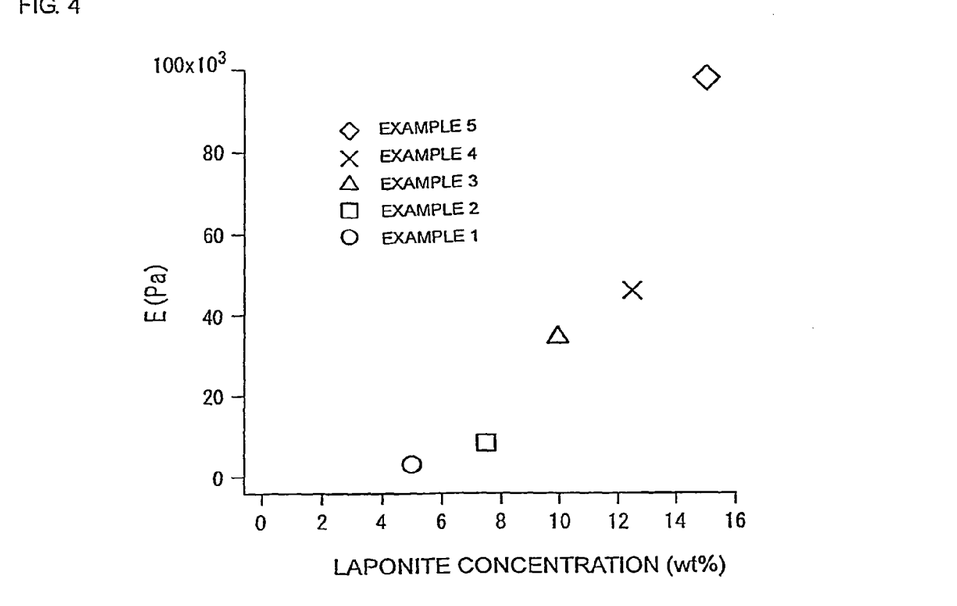
FIG. 4 is a graph showing a relation between the concentration of the clay particle and the elastic modulus that is obtained from FIG. 3.

The molded sample was compressed at a compression rate of 10 mm/min to measure a stress change. According to a relational formula: $\sigma = E\epsilon(\epsilon = \Delta L/L_0)$ and from an inclination of a stress $\sigma$–distortion $\epsilon$ curve in a region in which the compression ratio is small, the elastic modulus E was calculated. Here, $\Delta L$ is a compressed length and $L_0$ is a natural length. The stress was measured by taking into consideration an area change by the compression (calculated under such an assumption that the volume is not changed during the compression). The results of measuring the stress change are listed in FIG. 3. The stress values at a time point when the distortion factor was 80% ($\Delta L/L_0 = 0.8$) are listed in Table 7. As the result thereof, by adding the dispersant (TSPP), the hydrogel exhibited a high stress value. The viscous materials in a form of paste in Comparative Example 1 to Comparative Example 3 have been collapsed largely at a time point when the distortion factor was 80%. Furthermore, a relation between the LAPONITE concentration and the elastic modulus is shown in FIG. 4. As the result thereof, the higher the LAPONITE concentration was, the higher the value of the elastic modulus was.

TABLE 7

| | Composition [% by weight] | Stress (distortion factor: 80%) [Pa] |
|---|---|---|
| Comparative Example 1 | LAPONITE RD 5%/ASAP 1% | 7656 |
| Comparative Example 2 | LAPONITE RD 10%/ASAP 1% | 3628 |
| Comparative Example 3 | LAPONITE RD 15%/ASAP 1% | 5662 |
| Example 1 | LAPONITE RD 5%/ASAP 1%/TSPP 0.5% | 76635 |
| Example 2 | LAPONITE RD 7.5%/ASAP 1%/TSPP 0.5% | 77944 |
| Example 3 | LAPONITE RD 10%/ASAP 1%/TSPP 0.5% | 92289 |
| Example 4 | LAPONITE RD 12.5%/ASAP 1%/TSPP 0.5% | 78459 |
| Example 5 | LAPONITE RD 15%/ASAP 1%/TSPP 0.5% | 133814 |

Example 30

Uniaxial Compression Test of Hydrogel Using ASAP at Each Concentration

Figure 5:
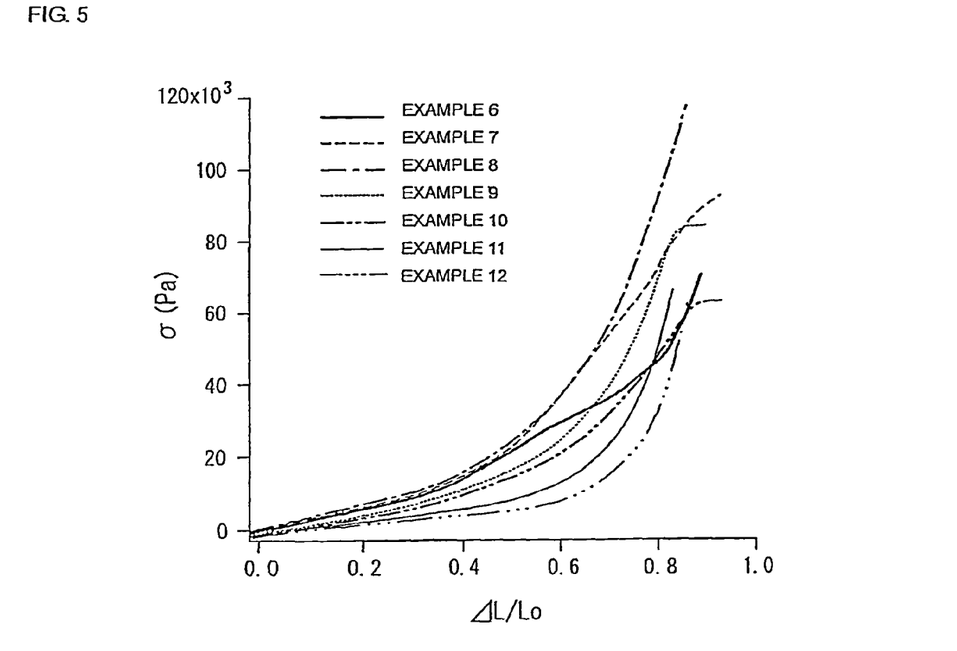
FIG. 5 is a graph of the results of stress changes measured in Example 30.
Figure 6:
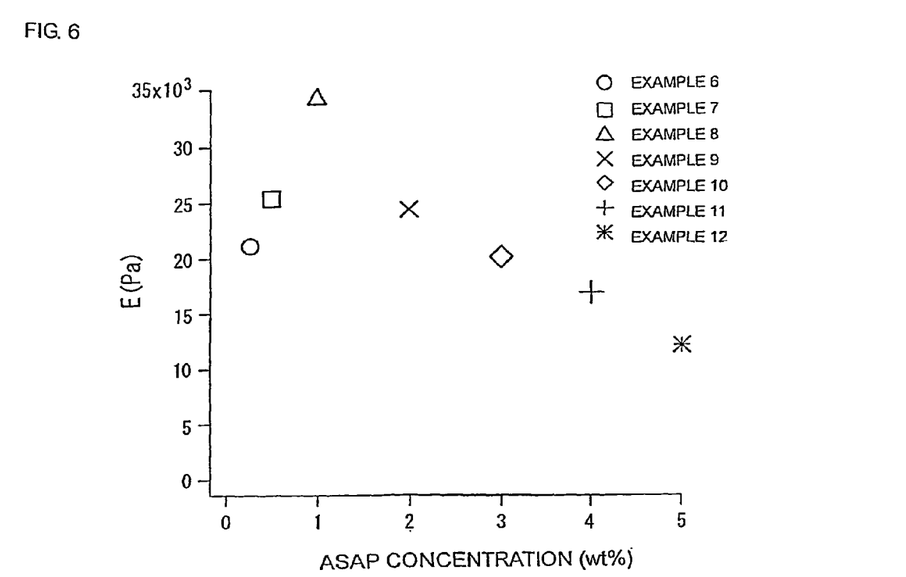
FIG. 6 is a graph showing a relation between the concentration of the polyelectrolyte and the elastic modulus that is obtained from FIG. 5.

The stress change of each of the hydrogels produced in Example 6 to Example 12 was measured according to Example 29. The results of the measured stress changes are listed in FIG. 5. A relation between the ASAP concentration and the elastic modulus is shown in FIG. 6. As the result thereof, when the ASAP concentration was 1% by weight, the hydrogel exhibited the highest value of the elastic modulus.

Example 31

Uniaxial Compression Test of Hydrogel Using TSPP at Each Concentration

The elastic modulus of each of the hydrogels produced in Example 13 to Example 24 and the viscous materials in a form of paste produced in Comparative Example 1 to Comparative Example 3 was measured according to Example 29.

Figure 7:
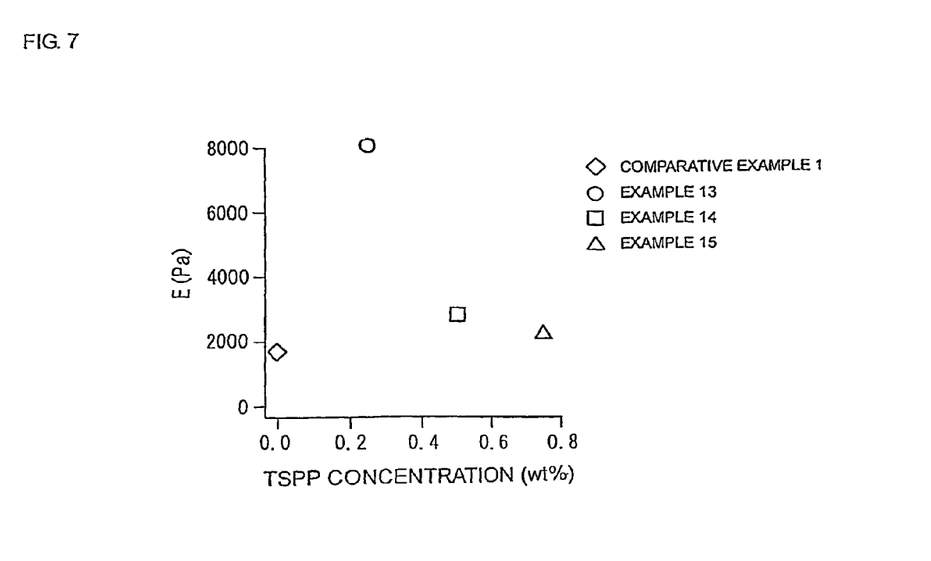
FIG. 7 is a graph showing a relation between the concentration of a dispersant and the elastic modulus.
Figure 8:
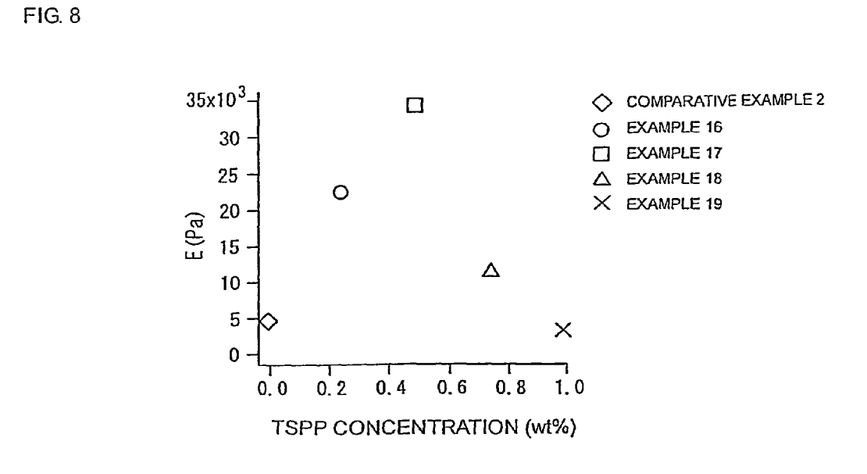
FIG. 8 is a graph showing a relation between the concentration of a dispersant and the elastic modulus
Figure 9:
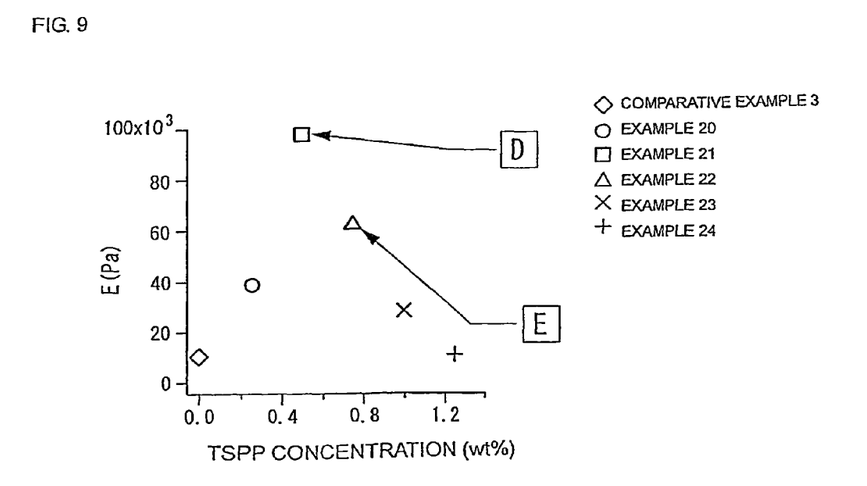
FIG. 9 is a graph showing a relation between the concentration of a dispersant and the elastic modulus.
Figure 10:
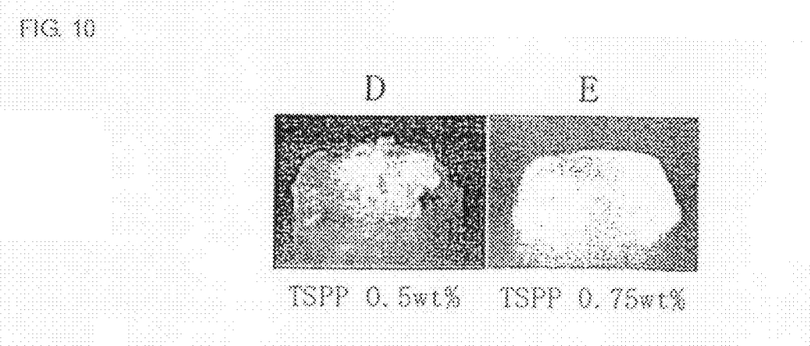
FIG. 10 is a photograph showing hydrogels of respective compositions of D and E in FIG. 9 after a uniaxial compression test.

The results of Example 13 to Example 15 and Comparative Example 1 are shown in FIG. 7; the results of Example 16 to Example 19 and Comparative Example 2 are shown in FIG. 8; and the results of Example 20 to Example 24 and Comparative Example 3 are shown in FIG. 9. FIG. 10 shows a hydrogel of the D composition and a hydrogel of the E composition in FIG. 9 after the uniaxial compression test. As the result thereof, the hydrogel exhibited the highest value of the elastic modulus in FIG. 7 when the TSPP concentration was 0.25% by weight and in FIG. 8 and FIG. 9 when the TSPP concentration was 0.5% by weight. However, according to the comparison in FIG. 10, while the hydrogel of D collapsed, the hydrogel of E did not collapse. As the result thereof, in FIG. 9, when the hydrogel was of the composition E (TSPP concentration: 0.75%), the hydrogel exhibited the highest value of the elastic modulus without collapse of the hydrogel.

Example 32

Uniaxial Compression Test of Hydrogel Using ASAP Having Corresponding Molecular Weight The fracture stress and the fracture compression ratio of each of the hydrogels produced in Example 25 to Example 27 were measured by the same operation as in Example 29. The results thereof are listed in Table 8. The larger the weight average molecular weight of ASAP was, the higher the value of the fracture stress was. The hydrogel of Example 25 produced using ASAP having a small molecular weight collapsed at a compression ratio of 80% or less, which exhibited that such a hydrogel is weak relative to a distortion.

TABLE 8

| | ASAP molecular weight | Fracture stress [Pa] | Fracture compression ratio [%] |
|---|---|---|---|
| Example 25 | 250,000 to 710,000[remark 2] | 22,000 | 58 |
| Example 26 | Weight average molecular weight 2,000,000 to 3,000,000 | 45,000 | 89 |
| Example 27 | Weight average molecular weight 4,000,000 to 5,000,000 | 85,000 | 81 |

[remark 2] Degree of polymerization × molar mass of monomer unit (molar mass of monomer unit = 94)

Example 33

Measurement of Small Angle X-Ray Scattering (SAXS)

With respect to each of the hydrogels produced in Example 3 and Example 1, the measurement of small angle X-ray scattering (SAXS) under extension was performed using a synchrotron small angle X-ray scattering apparatus (BL-10C; manufactured by High Energy Accelerator Research Organization). The sample was defoamed using a centrifuge (at 7,000 rpm for 10 minutes) and was molded into a shape of rectangular parallelepiped having a length of 18 mm, a width of 10 mm, and a thickness of 1 mm.

Figure 11:
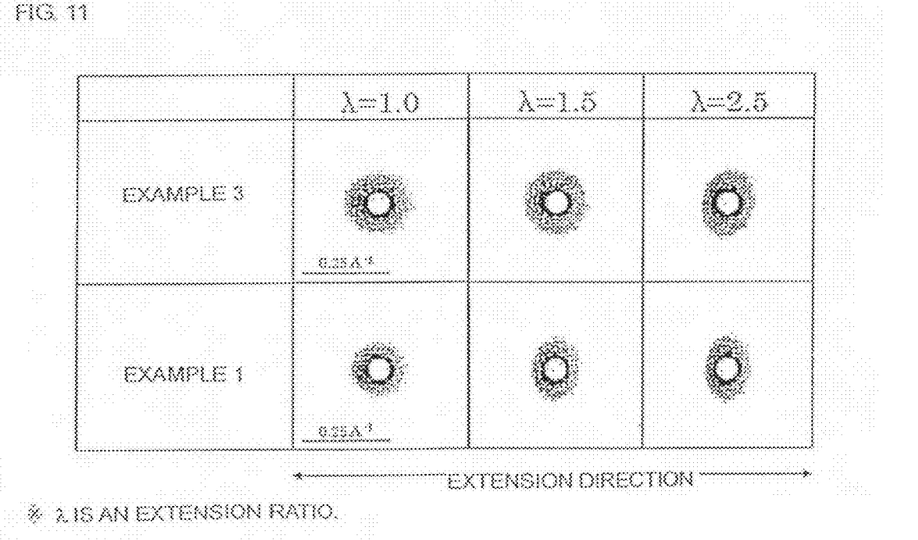
FIG. 11 is a table of the results of a small angle X-ray scattering (SAXS) measurement under extension.

A sample which was uniaxially extended in a horizontal direction was subjected to the measurement using an imaging plate (R-AXIS) as a detector. The results thereof are listed in FIG. 11. As the extension ratio increases, the scattering pattern transitions to a perpendicular direction relative to the extension direction. It is considered that this is because an edge face of the clay particle was aligned in an extension direction according to the extension of an ASAP polymer and a surface of the clay particle faced to the perpendicular direction. As the result thereof, it can be considered that there is an interaction between the edge face of the clay particle and ASAP and that a polymer/clay network is constructed.

Example 34

Production of LAPONITE RD 1% by Weight/ASAP 1% by Weight/TSPP 0.5% by Weight Stretchable Hydrogel 0.0335 g of sodium diphosphate decahydrate (sodium pyrophosphate decahydrate) (TSPP) (manufactured by Kanto Chemical Industry Co., Ltd.) and 3.883 g of water were mixed and the resultant mixture was stirred with a magnetic stirrer at room temperature (about 20° C.) until the mixture became a homogeneous TSPP aqueous solution. Then, while the TSPP aqueous solution was stirred with a magnetic stirrer, to the TSPP aqueous solution, 0.039 g of LAPONITE RD (manufactured by Rockwood Additives Limited) was added little by little and the resultant mixture was stirred at room temperature (about 20° C.) until the mixture became a homogeneous aqueous dispersion. Then, to the resultant aqueous dispersion, 0.040 g of sodium polyacrylate (ASAP) (Aronvis SX manufactured by Toagosei Co., Ltd.; weight average molecular weight: 4,000,000 to 5,000,000) was added little by little and the resultant mixture was stirred manually using a spatula instead of the magnetic stirrer until ASAP has been completely dissolved.

Then, the mixture was defoamed using a centrifuge (at 7,000 rpm for 10 minutes) and was settled at room temperature for 48 hours to obtain a hydrogel.

Example 35

Production of LAPONITE XLG 1.2% by Weight/ASAP 1% by Weight/TSPP 0.5% by Weight Stretchable Hydrogel 0.0334 g of sodium diphosphate decahydrate (sodium pyrophosphate decahydrate) (TSPP) (manufactured by Kanto Chemical Industry Co., Ltd.) and 3.887 g of water were mixed and the resultant mixture was stirred with a magnetic stirrer at room temperature (about 20° C.) until the mixture became a homogeneous TSPP aqueous solution. Then, while the TSPP aqueous solution was stirred with a magnetic stirrer, to the TSPP aqueous solution, 0.048 g of LAPONITE XLG (manufactured by Rockwood Additives Limited) was added little by little and the resultant mixture was stirred at room temperature (about 20° C.) until the mixture became a homogeneous aqueous dispersion. Then, to the resultant aqueous dispersion, 0.039 g of sodium polyacrylate (ASAP) (Aronvis SX manufactured by Toagosei Co., Ltd.; weight average molecular weight: 4,000,000 to 5,000,000) was added little by little and the resultant mixture was stirred manually using a spatula instead of the magnetic stirrer until ASAP has been completely dissolved.

Then, the mixture was defoamed using a centrifuge (at 7,000 rpm for 10 minutes) and was settled at room temperature for 48 hours to obtain a hydrogel.

Example 36

Production of LAPONITE RD 1% by Weight/ASAP 1% by Weight/TSPP 0.5% by Weight Stretchable Hydrogel The procedures in Example 34 were repeated except that sodium polyacrylate (ASAP) was altered to ASAP having a weight average molecular weight: 2,000,000 to 3,000,000 (Aronvis MX manufactured by Toagosei Co., Ltd.).

Example 37

Uniaxial Compression Test of LAPONITE RD 1% by Weight/ASAP 1% by Weight/TSPP 0.5% by Weight Stretchable Hydrogel The stress change of each of the stretchable hydrogels produced in Example 34 and Example 35 was measured using TENSILE TESTER S™-20 (manufactured by Orientec Co., Ltd.). The sample was defoamed using a centrifuge (at 7,000 rpm for 10 minutes), was molded into a column shape having a diameter of 14 mm and a height of 8 mm, and was settled at room temperature for 5 days.

Figure 12:
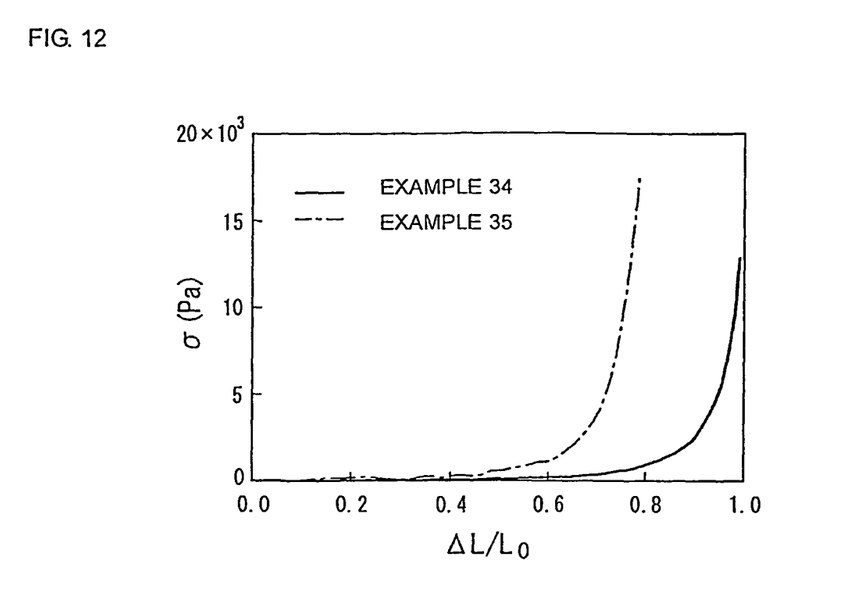
FIG. 12 is a graph of the results of stress changes measured in Example 37.

The molded sample was compressed at a compression rate of 10 min/min to measure a stress change. According to a relational formula: $\sigma=E\epsilon(\epsilon=\Delta L/L_0)$ and from an inclination of a stress $\sigma$–distortion $\epsilon$ curve in a region in which the compression ratio is small, the elastic modulus E was calculated. Here, $\Delta L$ is a compressed length and $L_0$ is a natural length. In the meantime, as the hydrogel is soft, the shape slightly changes from a column shape to a conical shape. Thus, $L_0$ was estimated under an assumption that the volume of the column having a diameter of 14 mm and a height of 8 mm is the same as the volume of the gel. In addition, as stress, a stress divided by initial cross-sectional area was used. The results of measuring the stress change are listed in FIG. 12, and elastic modulus is shown in Table 9.

TABLE 9

| | Elastic Modulus [Pa] |
|---|---|
| Example 34 | 712 |
| Example 35 | 794 |

Example 38

Measurement of Stretching Properties of LAPONITE RD 1% by Weight/ASAP 1% by Weight/TSPP 0.5% by Weight Stretchable Hydrogel The stretching properties of each of the stretchable hydrogels produced in Example 34 and Example 36 were measured. The sample was defoamed using a centrifuge (at 7,000 rpm for 10 minutes), was molded into a column shape having a diameter of 6 mm and a height of 2 cm, and was settled at room temperature for 7 days.

Figure 13:
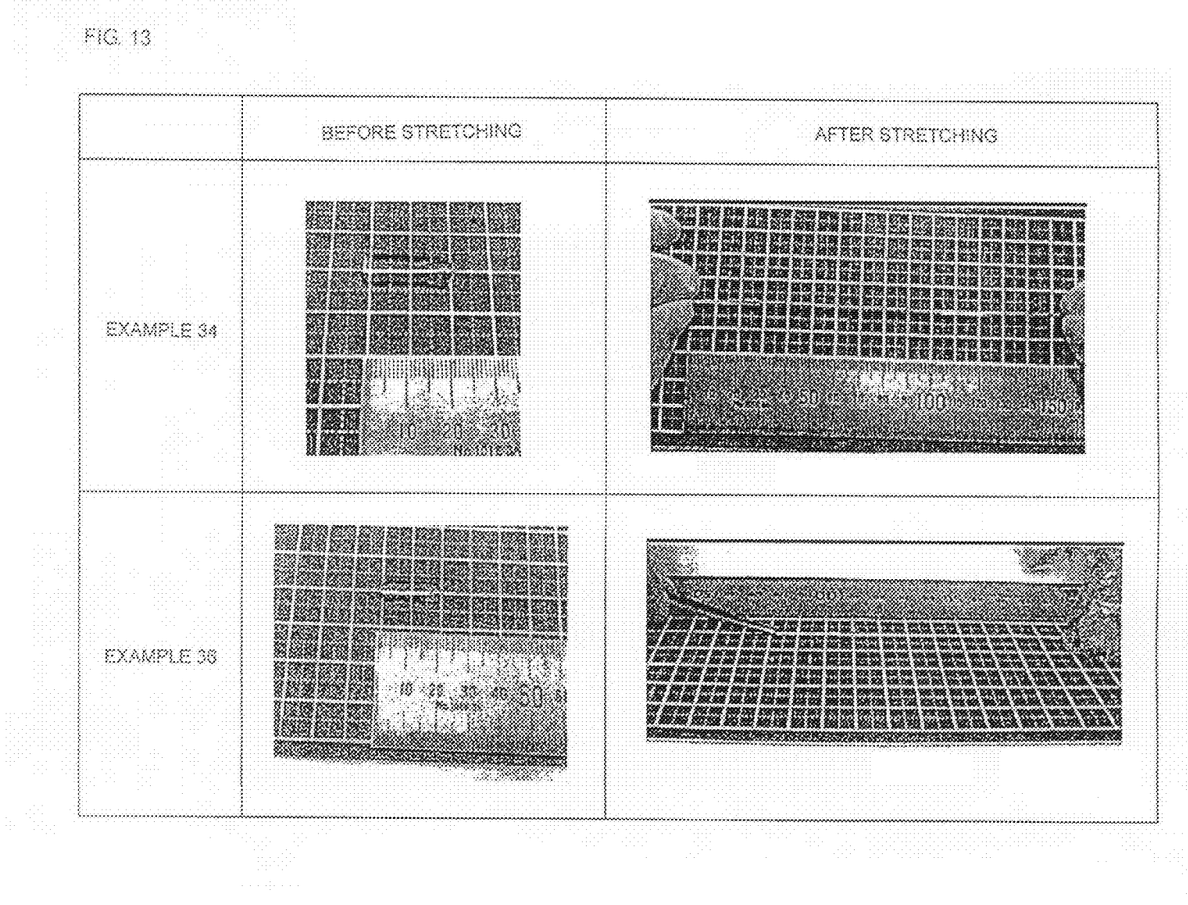
FIG. 13 is a photograph showing the results of measurements of stretching properties in Example 38.

The molded sample (hydrogel) was stretched by hands. The results thereof are shown in FIG. 13. The stretchable hydrogel produced in Example 34 was stretched about 7.5 times compared with the hydrogel that has not been stretched, and the stretchable hydrogel produced in Example 36 was stretched about 6 times compared with the hydrogel that has not been stretched.

Figure 14:
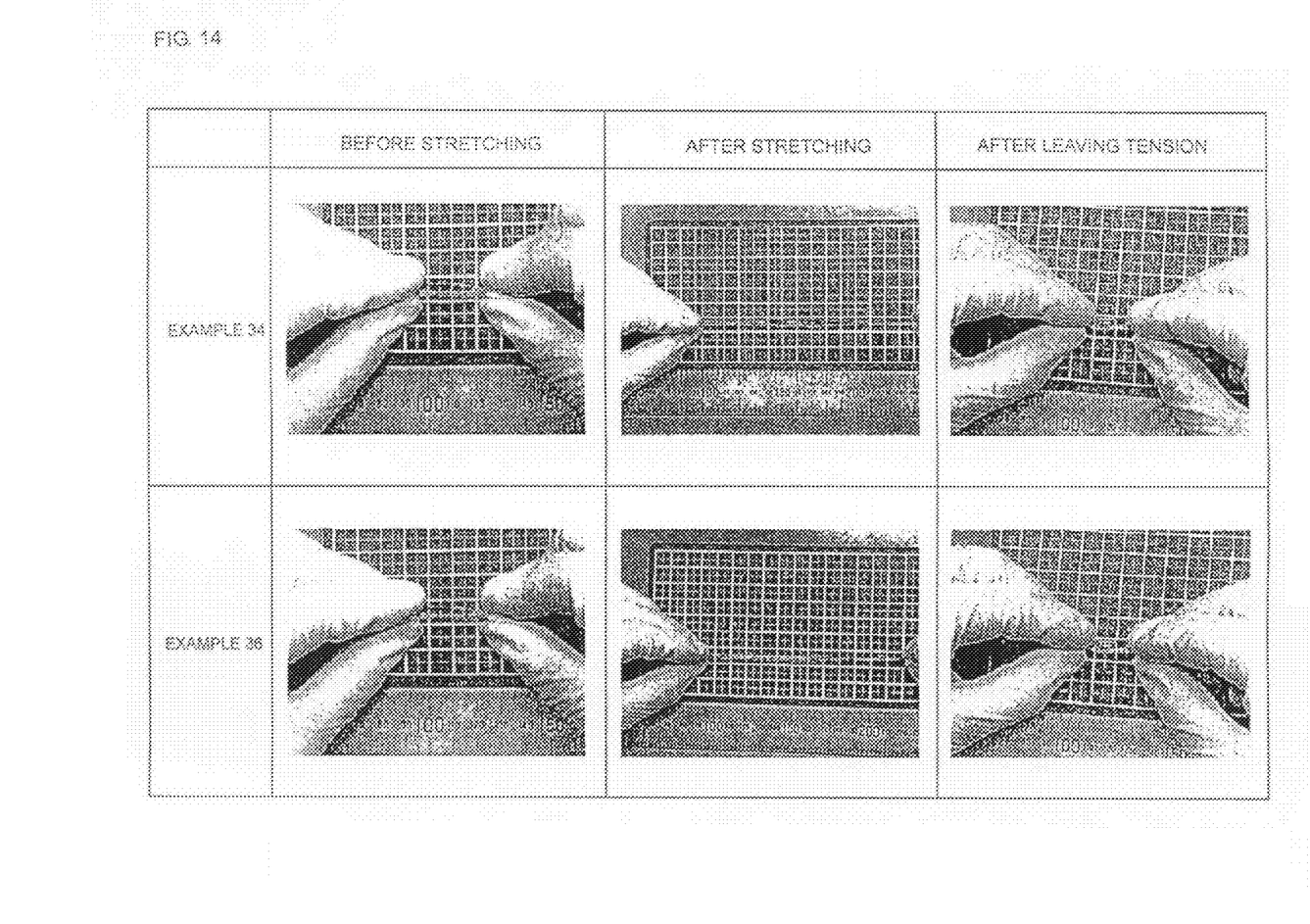
FIG. 14 is a photograph showing the results of measurements of stretching properties in Example 38.

In addition, after the measurement of the stretching properties, tension was left. The results thereof are shown in FIG. 14. Each of the stretchable hydrogels produced in Example 34 and Example 36 was contracted almost to the length of the hydrogel that has not been stretched.

The invention claimed is:

1. A stretchable hydrogel which is produced from a hydrogel-forming composition comprising
a polyelectrolyte,
clay particles, and
a dispersant for the clay particles,
wherein:
a product formed from the hydrogel-forming composition in a form of a column having a diameter of 6 mm and a length of 2 cm is stretchable 2 times or more in a length direction; and
in 100% by mass of the stretchable hydrogel. the polyelectrolyte is contained in an amount of 0.1 to 2.0% by mass, the clay particles are contained in an amount of 1.0 to 5.0% by mass, and the dispersant is contained in an amount of 0.1 to 1.0% by mass.

2. The stretchable hydrogel according to claim 1, wherein the polyelectrolyte is a completely neutralized or partially neutralized polyacrylic acid salt having a weight average molecular weight of 1,000,000 to 10,000,000,
the clay particles is a water-swelling silicic acid salt particle selected from the group consisting of smectite, bentonite, vermiculite, and mica, and
the dispersant is one or two or more selected from the group consisting of sodium orthophosphate, sodium diphosphate, sodium tripolyphosphate, sodium tetraphosphate, sodium hexametaphosphate, and sodium polyphosphate.

3. A method of producing a stretchable hydrogel, characterized by comprising:
mixing the polyelectrolyte, the clay particles, and the dispersant as claimed in claim 1 and water or a water-containing solvent to cause gelation of the resultant mixture.

* * * * *